(12) United States Patent
Gutekunst et al.

(10) Patent No.: US 11,893,906 B2
(45) Date of Patent: Feb. 6, 2024

(54) EXTENDED REALITY SIMULATOR WITH REAL-WORLD INTERACTION CAPABILITIES

(71) Applicant: ESG Elektroniksystem—und Logistik—GmbH, Munich (DE)

(72) Inventors: Sören Björn Gutekunst, Koblenz (DE); Peter Schneider, Fürstenfeldbruck (DE); Frank Klemmer, Nesse (DE)

(73) Assignee: ESG Elektroniksystem- und Logistik GmbH, Munich (DE)

( * ) Notice: Subject to any disclaimer, the term of this patent is extended or adjusted under 35 U.S.C. 154(b) by 0 days.

(21) Appl. No.: 17/983,158

(22) Filed: Nov. 8, 2022

(65) Prior Publication Data

US 2023/0306865 A1    Sep. 28, 2023

(30) Foreign Application Priority Data

Mar. 24, 2022   (EP) .................................... 22164239

(51) Int. Cl.
*G06T 9/00* (2006.01)
*G09B 9/00* (2006.01)
(Continued)

(52) U.S. Cl.
CPC ................ *G09B 9/00* (2013.01); *G06T 11/00* (2013.01); *G09B 23/303* (2013.01); *G06T 2210/41* (2013.01)

(58) Field of Classification Search
CPC ........ G09B 9/00; G09B 23/30; G09B 23/303; G06T 11/00; G06T 2210/41
See application file for complete search history.

(56) References Cited

U.S. PATENT DOCUMENTS 10,854,098 B1 *  12/2020  Welch ................... G09B 23/28
2007/0243512 A1  10/2007  King
(Continued)

FOREIGN PATENT DOCUMENTS

WO      2008018889 A2    2/2008
WO   WO 2009/097045      * 11/2008  ............... A61B 5/02

OTHER PUBLICATIONS

W. L. van Meurs et al. Functional Anatomy of Full-Scale Patient Simulators, Journal of Clinical Monitoring 13, 317 324, 1997
(Continued)

*Primary Examiner* — Timothy A Musselman
(74) *Attorney, Agent, or Firm* — Ewers IP Law PLLC; Falk Ewers

(57) ABSTRACT

A system and method for simulating injury treatment on a living body are provided. The system includes an embedded system configured to be placed on a living body and to simulate an injury of the living body in response to instructions received from a simulation system. Sensors detect a parameter corresponding to a treatment of said injury and transmit said parameter to said simulation system which transmit the instructions to the embedded system to cause it to simulate the injury. The simulation system is further configured to receive sensor data representing the parameter detected by the sensors and the treatment of the injury, and to execute a simulation scenario, which associates the detected parameter with a corresponding effect on the injury. Furthermore, the simulation system is configured to send instructions to the embedded system, which cause the embedded system to simulate the injury such that the simulation reflects the treatment.

15 Claims, 1 Drawing Sheet

(51) Int. Cl.
G06T 11/00 (2006.01)
G09B 23/30 (2006.01)

(56) References Cited

U.S. PATENT DOCUMENTS

2013/0295538 A1* 11/2013 Ambrose .............. G09B 7/00
                                                         434/218
2018/0293802 A1   10/2018 Hendricks et al.

OTHER PUBLICATIONS

D. K.J.E. von Lubitz et al. Simulation-based medical training: the Medical Readiness Trainer concept and the preparation for civilian and military medical field operations, VRIC, Virtual Reality International Conference, Laval Virtual, May 16, 18, 2001.

* cited by examiner

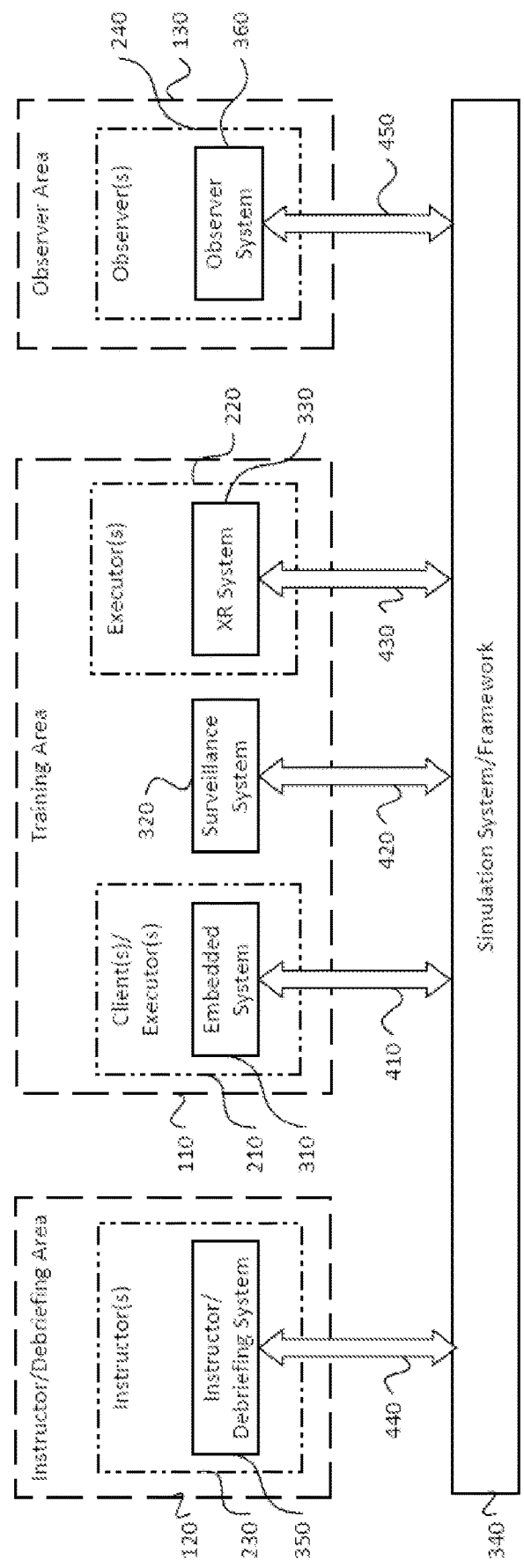

EXTENDED REALITY SIMULATOR WITH REAL-WORLD INTERACTION CAPABILITIES

CROSS REFERENCE TO RELATED APPLICATIONS

This application claims priority to European patent application EP 22164239.0, filed Mar. 24, 2022, the entire content of which is incorporated herein by reference.

TECHNICAL FIELD

System and method for simulating injuries and treatment of the simulated injuries on a living body based on a simulated injury scenario.

BACKGROUND

The difficulty in training combat medics is easy to understand. The combat medic is often in the field with other soldiers and at times alone and tasked to save the lives of his fellow soldiers without assistance. Training on how to treat a myriad of wounds and injuries is vitally important.

There are several known medical simulation systems that are directed to particular training aspects. Most of them use mannequins' systems to simulate a human or animal casualty and for first responder basic first aid resuscitation training or tactical combat casualty care (TCCC). These systems lack accurate realism as they are unable to reconstruct physical and psychological reactions of the injured person to be treated. An acting person may imitate the behavior of the injured indeed, however, this person will have considerable difficulties in responding with realism to pain or stress caused, for example, during the treatment applied by the first responder, without having an appropriate feedback system telling the actor whether the injuries are treated properly or not.

Simulations are based on situations and events from real life and enable learning in a safe, controlled environment. They help by reducing the gap between theory and practice. Scenarios can form the basis of training through simulations. Scenarios are structured descriptions of events or problems from the real world. They allow learners to deepen into a specific real-life problem and to find solutions to this problem. They must use their already acquired knowledge, cognitive and social skills, to successfully solve the problem or task. It is a method that allows learning in an authentic context and tries to put learners into a more active role. However, designing and preparing scenarios are no simple tasks. It is necessary to define how the process will proceed, describe the activity of the participants in the training, determine the roles they will take and the tools they will need. It is important to provide the most realistic environment for students to get accustomed to such situations.

As explained above, mannequins are usually used for injury simulation. However, these are unable to mimic human behavior realistically. Alternatively, actors are used as injured persons. However, depending on the scenario, these actors must be hired and require significant preparation time. Moreover, they may also have difficulty reacting appropriately to treatment by the first responder if they do not receive adequate feedback information.

Therefore, a system is needed that reduces the preparation time of actors in an injury simulation scenario while at the same time making the injury scenario as authentic and realistic as possible.

SUMMARY

An underlying problem of the present disclosure can therefore be regarded as how to modify a given injury simulation system that is based on mannequins so that it can be applied to a living body.

In accordance with an aspect of the disclosure, said problem is solved by a system and a method for simulating injury treatment on a living body as described herein.

A summary of various aspects of the present disclosure is hereinafter presented to provide a basic understanding of these aspects and their associated advantages. Further aspects and technical details are covered in the subsequent chapter entitled "detailed description".

The present disclosure is directed to provide a system for simulating injury treatment on a living human or animal acting as an injured living body in a training scenario and thereby eliminating the need for mannequins for injury simulation. Furthermore, the disclosure aims at providing a method for simulating injury treatment on the injured living body.

According to an aspect of the disclosure, a system for simulating injury treatment on a living body includes an embedded system configured to be placed on a living body and to simulate an injury of the living body in response to instructions received from a simulation system. The system further includes one or more sensors configured to be placed on the living body and to detect a parameter corresponding to a treatment of said injury, said one or more sensors being further configured to transmit said detected parameter to said simulation system. The simulation system is connected to said one or more sensors and configured to transmit the instructions to said embedded system to cause said embedded system to simulate said injury of the living body, and to receive sensor data representing said parameter detected by said one or more sensor and representing said treatment of said injury, and to execute a simulation scenario, which associates said detected parameter representing said treatment of said injury with a corresponding effect on said injury. Furthermore, the simulation system is configured to send instructions to said embedded system, which cause said embedded system to simulate said injury such that the simulation reflects said treatment.

The system may eliminate the need for practice mannequins or enlarge their scope of training. Furthermore, the system may enable a sensor feedback system by simulating injuries on the living body and collecting data on how the first responder treats the simulated injuries. A control unit may analyze the sensor data, generate, and transmit new instructions to the embedded system or injury simulation module. The instructions may cause the simulated injuries and the actor (living body) to respond as realistically and authentically as possible to the applied treatment. This can make simulated injury treatment very authentic while reducing the need for preparing actors and the time spent preparing the injury scenarios. Next to the possibility to direct the actor of the injured body.

According to an aspect of the disclosure, the embedded system may include one or more actuators configured to be placed on the living body and to simulate said injury of the living body in response to the instructions sent from said simulation system, wherein said simulation system is connected to said one or more actuators.

According to another aspect of the disclosure, the one or more actuators may be computer-controlled and may correspond to at least one of the following: a pump for spilling a liquid to simulate a bleeding injury or other liquid losses, an indicator for visual effects of the injury or status of the injury, a speaker for acoustic effects related to the injury, a box for packing a bandage of a simulated wound or an intraosseous infusion (TO), intravenous therapy (IV), a motor for simulating an injury comprising dislocations and/or open broken bones. The above features provide for a realistic simulation of the injury.

According to still another aspect, said one or more sensors may correspond to at least one of the following: a pressure sensor to detect a location and amount of an exertion of pressure of the treatment, a gyroscopic sensor or an accelerometer to detect a movement and acceleration of the living body based on the treatment, a resistance sensor to detect a location and amount of an exertion of pressure and/or a cut of the executed treatment, and a temperature sensor to detect an increase or decrease in temperature of the living body based on the treatment. The above is advantageous in that it enables a reproducible evaluation of the treatment carried out.

According to a further aspect of the disclosure, the simulation scenario may associate the detected parameter caused by said treatment with a corresponding control signal to said embedded system to simulate a change in the simulated injury in response to said detected parameter. This is advantageous for simulating the injury in a realistic manner.

According to yet another aspect of the disclosure, the embedded system may further include one or more markers to be placed on said living body, and wherein said simulation system is adapted to replace said one or more markers in an image taken by a camera of an XR system by a simulation image, which simulates said injury at the location of said one or more markers, wherein said injury simulated at the location of said one or more markers includes at least one of the following: an open wound, a pneumothorax, a frostbite, a combustion, a cut, a pleural effusion, a hemothorax, a bleeding; and wherein the XR system further includes an extended reality headset including a camera and a display. This allows for a realistic injury simulation and overall injury simulation scenario and leads to improved first responder training results.

According to a further aspect of the disclosure, the embedded system may include one or more environment markers to be placed in an environment of the living body, wherein the simulation image simulates changes, parts, items, devices, wearables or displays in the environment of the living body at the location of said one or more environment markers, wherein said changes simulated in said environment of the living body at the location of said one or more environment markers includes at least one of the following: a shot, an explosion, a leakage, a fire or an electric shock. This provides a realistic representation of the injury scenario and integrates the first responder into a scenario that is close to reality, thereby leading to improved first responder training results. The virtual representation of medical equipment and screens displaying live treatment and live body data reduces scenario preparation time by eliminating the need to provide real equipment but is not limited to said virtual equipment only, as real equipment can be used in the virtual surrounding accordingly.

According to a particular aspect of the disclosure, the treatment detected by said one or more sensors may include at least one of the following: a tourniquet, a compression bandage, a tracheotomy, a thoracocentesis, a chest tube, a puncture, an infusion, a wound packing, a fixing of broken bone, a wound sealing, an intraosseous infusion (TO), intravenous therapy (IV).

According to a still further aspect of the disclosure, the simulation system may include a console or station and the simulation system may be further configured to receive user inputs provided by a user over the console or station, and to generate user instructions based on the received user inputs, and/or said system may further include an earphone configured to be placed in the ear of the living body to be treated, and said simulation system may be further adapted to transmit instructions to said earphone and the embedded system.

Pursuant to one further aspect of the disclosure, the system may include a virtual environment generated and controlled by the simulation system such that it simulates by acoustic, physical, and visual stimulus to a user conducting the treatment in the virtual environment comprising one of the following: a battlefield scenario, a traffic accident scenario, a natural disaster scenario, a household accident scenario, a riot scenario, a marine scenario, a casualty evacuation, a medical evacuation, a casualty collection point (CCP), or a firefighting scenario. The above provides for an improved scenario in terms of a more realistic simulation by increasing the stress for the trainee, thus, leading to an improved training effect.

According to another aspect of the disclosure, the system may include one or more user sensors configured to detect a user parameter of the user conducting the treatment, wherein the one or more user sensors correspond to at least one of the following: a pulse oximeter, a pulse meter, a heart rate variability sensor, a breathing sensor, a video-oculography (VOG) or electrooculography (EOG) sensor. This is advantageous in that the first responder's stress level can be accurately determined to help them achieve better training results.

According to yet a further aspect of the disclosure, the acoustic and physical stimulus to the user conducting the treatment may be generated by one or more environment actuators placed in the virtual environment, and controlled by the simulation system, and wherein the one or more environment actuators correspond to at least one of the following: a motor, a pump, a gas exhaust, or a flame and smoke generator.

According to an aspect of the disclosure, the embedded system may be incorporated into at least one of the following: a garment, an item, a device, a wearable, or a bag. As a result, the positioning accuracy for the embedded system on the living body can be improved.

According to still another aspect of the disclosure, a method for simulating injury treatment on a living body, includes, simulating by an embedded system placed on a living body an injury of the living body in response to instructions received from a simulation system, detecting by one or more sensors placed on a living body a parameter corresponding to a treatment of said injury, said one or more sensors being configured to transmit said detected parameter to said simulation system. The simulation system performing the following steps by a simulation system connected to said one or more sensors, transmitting the instructions to said embedded system to cause said embedded system to simulate an injury of the living body, receiving sensor data representing said parameter detected by said one or more sensors and representing a treatment of said simulated injury, executing a simulation scenario, which associates said detected parameter representing a treatment of said injury with a corresponding effect on said injury, sending instructions to said embedded system, which cause said embedded system to simulate said injury such that the simulation reflects said treatment.

The foregoing summary and the following detailed description of exemplary embodiments will be more readily understood if read in conjunction with the accompanying drawing. To illustrate the disclosure, the drawing shows exemplary details of the embodiments described. The information shown in the drawing is exemplary and explanatory only and does not limit the claimed disclosure.

BRIEF DESCRIPTION OF THE DRAWINGS

The disclosure will now be described with reference to the drawing wherein:
FIG. 1 is an example diagram of the overall system.

DESCRIPTION OF EXEMPLARY EMBODIMENTS

The present disclosure relates to a system and method for simulating injuries and the treatment of the simulated injuries on a living body based on a specific simulated injury scenario.

Simulated injury scenarios in this context are structured simulations of events or problems from the real world involving a living body like a human or an animal being injured. This includes for example, a battlefield scenario, a traffic accident scenario, a natural disaster scenario, a household accident scenario, a riot scenario, a marine scenario, a casualty evacuation, a medical evacuation, a casualty collection point (CCP), or a firefighting scenario. The injuries on the living body are simulated in accordance with the selected scenario and for example include an open wound, a pneumothorax, a frostbite, a combustion, a cut, a pleural effusion, a hemothorax, or a bleeding.

FIG. 1 shows an overall diagram of the system.

The central part of FIG. 1 shows the training area 110, that is the area in which the training takes place, and the injury scenario is simulated. The training area 110 includes at least one client 210 and at least one executor 220, wherein both are connected to a simulation system or central control unit 340 via an embedded system connection 410 and an extended reality (XR) system connection 430. The embedded system connection 410 and the XR system connection 430 enable bidirectional data exchange and may be wireless or wired.

The client 210 is the injured living body to whom an action is performed by the executor 220, the action being a treatment of the simulated one or more injuries of the living body. The executor 220, as a first aider, for example, executes the actions. It is also conceivable that multiple executors participate in the scenario.

The system includes sensors that are configured to be placed on the living body or the client 210. The sensors are configured to detect and measure one or more parameters that correspond to a treatment of a simulated injury of the client 210. As described in the previous paragraph the executor 220 conducts such treatment of the living body. The sensors, and the parameters they measure, include a pressure sensor to detect a location and an amount of an exertion of pressure of the treatment, a gyroscopic sensor or an accelerometer to detect a movement and acceleration of the living body based on the treatment, a resistance sensor to detect a location and an amount of an exertion of pressure of the treatment and/or a cut or incision made as part of the treatment, or a temperature sensor to detect an increase or decrease in temperature of the living body based on the treatment. The treatments detectable by the sensors or being determined by the simulation system 340 based on the measured sensor parameters include, among others, a tourniquet, a compression bandage, a tracheotomy, a thoracocentesis, a chest tube, a puncture, an infusion, a wound packing, a vacuum splint for fixing of broken bones, and a wound sealing. Upon detection of a treatment and a measurement of the corresponding parameters resulting from the treatment, the sensors transmit the detected or measured parameters via embedded system connection 410 to the simulation system 340 for further processing and analysis of the data. Depending on the type of treatment detected and the way the treatment is performed, the simulation system 340 generates instructions or control signals. These instructions are sent to the embedded system 310 and cause the actuators to simulate the effects of the treatment on the simulated injury, that is, a change in the simulated injury in response to the detected parameter. For example, a sensor may detect a pressure applied in proximity of or on the wound and transmits the sensor measurements to the simulation system 340. When analyzing the received data, the simulation system 340 determines that the pressure must be induced by a compression bandage, for example, because the pressure detected by the sensors is constant over a certain area. In response, the simulation system 340 instructs the pump to reduce fluid flow based on the location, the amount, the area, and the duration of the pressure applied. Next to the real fluid flow, a corresponding virtual visual and audio effect is possible to increase the immersion of the said wounding.

The client 210 is equipped with the embedded system 310. The embedded system 310 is a combination of hardware and software that includes one or more actuators. The software may in one implementation include a computer program for controlling the actuators in response to signals received from sensors and/or a simulation system 340.

The embedded system 310 may further include an embedded computer. The actuators are configured to be placed on the living body and to simulate an injury of the client 210. For example, the embedded system 310 may be integrated into a garment to be worn by the client 210 or alternatively or in addition thereto in a bag, an item, a wearable, or a device such as but not limited to defibrillator, patient monitor, stretcher, first aid equipment, first aid box, bag and environmental items like tree stump, road marking, helmet, cables, tubes, cable or tube reel, handrail, chair, sofa, pouches, bottles, radio set, intercoms, magazine bag, field harness, binoculars, equipment bag, backpack, bag, or mines. The embedded system 310 and the actuators are controlled by the simulation system 340 and receive the corresponding control instructions via embedded system connection 410. The actuators may correspond to a pump for spilling a liquid to simulate a bleeding injury or other liquid losses, an indicator for visual effects of the injury or status of the injury such as but not limited to light bulbs, LEDs, diodes, glow lamps, displays, analog displays, or servo mechanical displays, a speaker for acoustic effects related to the injury such as but not limited to screaming, breathing, fading/gaining/steady physiological noises (heart noises, lung noises [crackling, stridor, rhonchi, whooping, pleural friction rub, mediastinal rub], colon noises), suffocation, running liquids, a box for packing a bandage of a simulated wound, an intraosseous infusion (TO) or intravenous therapy (IV), a compartment to set an access or infusion, a motor for simulating an injury comprising dislocations and/or open broken bones. For example, the client 210 could have suffered a gunshot wound to the leg within a war scenario. The simulation system 340 may instruct the pump to simulate a wound at the part of the leg that was hit by the bullet by dispensing blood-like fluid.

FIG. 1 further shows a simulation system 340. The simulation system 340 is the central computing unit including the necessary hardware such as switches/routers, control units (fog, air conditioning, light, sound, vibration, pump, etc.). This system serves as the central connection of all components but can also take over subsystems, e.g., smaller simulators, such as the embedded system 310, the surveillance system 320, the computing unit of the XR System 330, the instructor/debriefing System 350 and/or the observer system 360. Furthermore, video-sound recordings of the training can be stored here and distributed for later use.

The simulation system 340 may provide the processed sensor data to a console or station that is controlled by a user or an instructor. Based on user inputs received over the console or station, the simulation system 340 generates user instructions that are transmitted to the embedded system 310 or to the client 210. The user instructions transmitted to the embedded system 310 are control signals for controlling the injury simulation performed by the embedded system 310. The user instructions when transmitted to the client 210 instruct the client 210 to behave in a certain way. The instructions are received by headphones in the client's 210 ear or by glasses worn by the client 210, to instruct the client 210 how to respond to specific treatments performed by the executor 220.

The simulation system 340 may also provide instructions that are generated based on the measured sensor data directly to the client 210 without requiring user inputs on the console or station. The instructions include feedback information for the client 210 that instructs the client 210 to respond to an injury treatment in a specific way. For example, suppose the simulation system 340 registers that the executor 220 is improperly treating a wound, for example, by applying a compression bandage too tightly. If the simulation system 340 determines that the executor 220 is causing significant pressure and thus pain, it relays this information to the client 210. The client 210 may then respond to the injury treatment by screaming or twitching the limbs.

FIG. 1 further shows that the executor 220 is equipped with an XR system 330. The XR system 330 comprising an XR or mixed reality headset with a computing unit (mobile, stationary, or embedded) for generating the view. The computing unit can be embedded in the glasses, attached to the person or, e.g., placed externally as a high-end workstation (as a backpack or similar). Depending on the need as a wired or wireless system between glasses XR headset with computing unit. Analogous to the embedded system 310, the XR headset can be connected to an independent computing unit or, for example, to a central simulation host like the simulation system 340 (centralized or decentralized implementation). The connection between XR system 330 and simulation system 340 via XR system connection 430 is bidirectional. The simulation system 340 controls the simulation and generates the mix of virtual and real environment/world. Also, the live video of XR vision or eye cameras etc. is transmitted from the headset and made available for further use.

The training area 110 may additionally include one or more markers to be placed on the living body. A marker in this context is a visual marker, for instance, a binary marker or an image or an object that can be recognized by the XR system 330 and is used to trigger augmented reality features. The markers are used to simulate additional injuries, which are only visible in virtual or extended reality, the additional injuries comprising, for example, an open wound, a pneumothorax, a frostbite, a combustion, a cut, a pleural effusion, a hemothorax, or a bleeding. The executor 220 or any other participant will be able to see the injuries when wearing the XR headset.

In addition to the markers that are placed on the client 210, or alternatively, the training area 110 may also include environment markers to be placed within the training area in the environment of the living body. The environment markers are used as fixed point of reference for augmented reality features, for example, for simulating environmental changes, parts, items, devices, wearables or displays. For instance, medical devices can be provided to the executor 220 in virtual and extended reality, displaying simulated data on the condition of the injured living body or feedback data from the sensors placed on the living body.

The environment markers can also be used to simulate changes in the living body's environment. These changes may depend on the scenario and include, for example, a shot, an explosion, a leakage, a fire, or an electric shock. During a submarine flooding casualty, for example, the markers may be used to simulate a leak and an ingress of water into the submarine or a damage to the submarine engine.

Furthermore, a virtual environment may be generated in the training area 110 that is controlled by the simulation system 340. The virtual environment is generated in a chromakey room, in a room with screens or projectors, or by object-based masking, meaning that only digital content without an environment can be shown, for example, through depth detection with LIDAR and everything further than 2 to 5 meters away is displayed digitally. The virtual environment makes the simulated injury scenario more realistic by simulating an acoustic, physical, and visual stimulus to the executor 220. A stimulus is anything that can trigger a physical or behavioral change of the executor 220, for example, sights, sounds, smells, and temperature changes. Depending on the scenario, a respective virtual environment is generated, for example, a battlefield, a traffic accident, a natural disaster, a household accident, a riot, a marine accident, a casualty evacuation, a medical evacuation, a casualty collection point (CCP), or a firefighting accident. These scenarios and interactions can be amplified and more immersive with the aid of extended reality simulation as well as group training and multiplayer aspects.

The training area 110 may further include environmental actuators placed in the virtual environment and controlled by the simulation system 340 for generating further stimuli to the participants of the training scenario based on optical, physical, chemical, and/or mechanical technology. The actuators, for instance, include a motor, a pump, a gas exhaust, a headlight, a light reflector, a light source, a light shutter, a flame and smoke generator, or actuators based on self-contained and self-sustained exothermic chemical reactions to make heat, light, gas, smoke and/or sound. Next to effect generators for shots, fire, sirens, screaming, noise, vehicles [car, tank, helicopter, ship, boat, etc.], rivers, waves, persons, wind, rain, snow, or leakages (gas, liquid, solids). For example, within a firefighting accident scenario flame, liquid, and smoke generators may be used to add more realism to the overall setting.

The executor 220 may also be equipped with sensors, as well. These sensors are configured to detect parameters of the executor 220 conducting the treatment and, for example, include a temperature sensor, a pulse oximeter, a heart rate variability sensor, a breathing sensor, or a video-oculography or electrooculography sensor. The video-oculography or electrooculography sensor detect eye direction, an eye movement, blinking rate, and saccadic eye movement. The sensors transmit the sensor data to the simulation system 340 for further processing.

The training area 110 also includes a surveillance system 320. This typically includes cameras (e.g., IR, electro-optical, thermal, magnetic) or webcams to capture and transmit live footage from the training area 110 in the instructor area 120 or observer area 130. Depending on the need, a wired or wireless system can be used.

The system shown in FIG. 1 in one implementation may also include an instructor or debriefing area 120. This is the area in which training is controlled, observed, and evaluated by instructors 230. Control and evaluation can be split in the same area/room or in separate areas. Separate areas allow parallel training and debriefing and thus increase the efficiency/performance of the training. The instructor 230 is an expert who controls the simulation, instructs the client 210, in addition to the simulation system 340 and executor 220, and evaluates the action of the same. The instructor 230 controls an instructor or debriefing system 350, which is a system for control and observation of the simulation. Control and evaluation can be implemented on one system or several separate systems. It can be implemented stationary via a workstation or mobile as tablet/smartphones/smart wearables or similar. Likewise, the computing unit of the simulation system/framework can be used for this purpose. The instructor or debriefing system 350 communicates with the simulation system 340 through a wireless or wired communication 440, for example, for transmitting commands to control the simulation such as start, stop pause, record, replay, mission selection, weather, day-/nighttime and events. Also transmitted is information to display events and sequence of actions in the simulation such as videos, readings, wounded condition, or objects.

The system shown in FIG. 1 may also include an observer area 130. This is the area or room in which people observe the current simulation. The observer area 130 is where other participants, instructors, and/or spectators can participate in the current training remotely or on-site. It can be one area/room or multiple areas/rooms that can be in multiple locations. This area/room is not necessary for the simulation itself but adds value as an extension. The observers 240 are training participants who observe the current training to learn from others' mistakes. Instructors/trainers can also be included here. These people are not necessary for the training, however, if they are included it increases the training success. The observer area 130 includes an observer system 360, which is a system for observing the simulation without the possibility to intervene. It can be implemented stationary via a workstation or mobile as tablet/smartphones/smart wearables or similar. One or more simultaneously used systems are possible. Likewise, the computing unit of the simulation system/framework can be used for this purpose. The observer system 360 is connected to the simulation system 340 via wireless or wired communication 450. Information for displaying events in the simulation, such as videos and measured values, is transmitted. Audio-visual exchange with other systems is enabled.

A method for simulating an injury treatment of a living body may include the following steps.

Simulating an injury of the living body in response to instructions received from the simulation system 340.

Detecting or measuring parameters by the sensors placed on the living body corresponding to the treatment of said injury conducted by an executor 220. Transmitting the detected parameters to the simulation system 340 for processing and analyzing.

Transmitting instructions by the simulation system 340 to the embedded system 310 to cause the embedded system 310 to simulate injuries of the living body.

Receiving sensor data by the simulation system 340 that represents the parameters detected or measured by the sensors and that represent or correspond to a treatment of the simulated injury.

Executing a simulation scenario by the simulation system 340, which associates the detected parameter representing a treatment with a corresponding effect on the injury and sending instructions to the embedded system 310 causing it to simulate the injury such that the simulation reflects the treatment.

In one exemplary embodiment, detecting by the sensors location and amount of an exerted pressure, and the simulation system 340 instructing a pump to reduce the spilling of liquid depending on the detected location and amount of the exerted pressure.

In another exemplary embodiment, instructing by the simulation system 340 the actuators to simulate the injury.

In yet another exemplary embodiment, the method includes simulating injuries in virtual and extended reality by placing markers on the living body. Furthermore, simulating changes, parts, items, devices, wearables or displays in virtual and extended reality by placing environment markers in the environment of the living body, the training area 110.

In another exemplary embodiment, receiving by the simulation system 340 instructor inputs via a console or station of the instructor debriefing system 350. Furthermore, generating by the simulation system 340 instructions based on the received inputs, and transmitting the instructions to the embedded system 310, the XR system 330, or the client 210.

In one exemplary embodiment, processing and analyzing the sensor data by the simulation system 340 and sending instructions to the client's 210 headphones or glasses.

In another exemplary embodiment, generating by the simulation system 340 a virtual environment in the training area 110.

Optionally, in another exemplary embodiment, controlling by the simulation system 340 environment actuators placed in the training area 110 to generate an acoustic, visual, or physical stimulus to the executor 220.

It will be understood by the skilled person that the exemplary embodiments described herein may be implemented by software (a computer program), hardware, or a combination of both. In particular, as far as any functions with respect to the elements described herein are concerned, such as the transmission of data, the reception of data, or the controlling of any device such as sensors or actuators or a simulation engine, these functions may be implemented by a combination of suitable hardware (e.g., communication links, transmission and/or reception modules, sensors, actuators, processors) and one or more computer programs controlling the hardware by executing the computer program.

It is also understood that the foregoing description is that of the exemplary embodiments of the disclosure and that various changes and modifications may be made thereto without departing from the spirit and scope of the disclosure as defined in the appended claims.

What is claimed is:

1. A system for simulating injury treatment on a living body, the system comprising:
   an embedded system configured to be placed on a living body and to simulate an injury of the living body in response to instructions received from a simulation system;

one or more sensors configured to be placed on the living body and to detect a parameter corresponding to a treatment of said injury, said one or more sensors being further configured to transmit said detected parameter to said simulation system;

said simulation system being connected to said one or more sensors and being configured to:

transmit the instructions to said embedded system to cause said embedded system to simulate said injury of the living body;

receive sensor data representing said parameter detected by said one or more sensor and representing said treatment of said injury;

execute a simulation scenario, which associates said detected parameter representing said treatment of said injury with a corresponding effect on said injury; and send instructions to said embedded system, which cause said embedded system to simulate said injury such that the simulation reflects said treatment; and an earphone configured to be placed in an ear of the living body to be treated and said simulation system being adapted to transmit instructions to said earphone.

2. The system of claim 1, wherein said embedded system comprises one or more actuators configured to be placed on said living body and to simulate said injury of the living body in response to the instructions sent from said simulation system, and wherein said simulation system is connected to said one or more actuators.

3. The system of claim 2, wherein said one or more actuators are computer-controlled and correspond to at least one of the following:

a pump for spilling a liquid to simulate a bleeding injury or other liquid losses, an indicator for visual effects of the injury or status of the injury, a speaker for acoustic effects related to the injury, a box for packing a bandage of a simulated wound or an intraosseous infusion (IO), intravenous therapy (IV), and a motor for simulating an injury comprising dislocations and/or open broken bones.

4. The system of claim 1, wherein said one or more sensors corresponds to at least one of the following:

a pressure sensor to detect a location and amount of an exertion of pressure of the treatment, a gyroscopic sensor or an accelerometer to detect a movement and acceleration of the living body based on the treatment, a resistance sensor to detect a location and amount of an exertion of pressure and/or a cut of the treatment, or a temperature sensor to detect an increase or decrease in temperature of the living body based on the treatment.

5. The system of claim 4, wherein said simulation scenario associates the detected parameter caused by said treatment with a corresponding control signal to said embedded system to simulate a change in the simulated injury in response to said detected parameter.

6. The system of claim 1, wherein said embedded system further comprises one or more markers to be placed on said living body, wherein said simulation system is adapted to replace said one or more markers in an image taken by a camera of an XR system by a simulation image, which simulates said injury at the location of said one or more markers, wherein said injury simulated at the location of said one or more markers comprises at least one of the following:

an open wound,
a broken bone
a pneumothorax,
a hematoma,
a frostbite
a hypothermia,
a burn,
a cut,
a pleural effusion,
a hemothorax,
a fragmentary remains,
a foreign object, or
a bleeding, and wherein the XR system further comprises an extended reality headset including a camera and a display.

7. The system of claim 1, wherein said embedded system further comprises one or more environment markers to be placed in an environment of the living body, wherein the simulation image simulates changes, parts, items, devices, wearables or displays in the environment of the living body at the location of said one or more environment markers, and wherein said changes simulated in said environment of the living body at the location of said one or more environment markers comprises at least one of the following:

a shot,
an explosion,
a leakage,
a fire, or
an electric shock.

8. The system of claim 1, wherein said treatment detected by said one or more sensors comprises at least one of the following:

a tourniquet,
a compression bandage,
a tracheotomy,
a thoracocentesis/needle decompression,
a chest tube,
a puncture,
an infusion,
a wound packing,
a splinting, or
a wound sealing.

9. The system of claim 1, wherein the simulation system comprises a console or station and the simulation system is further configured to:

receive user inputs provided by a user over the console or station, and generate user instructions based on the received user inputs.

10. The system of claim 1, wherein the system comprises:

a virtual environment generated and controlled by the simulation system such that it simulates an acoustic, physical, and visual stimulus to a user conducting the treatment in the virtual environment comprising one of the following:

a battlefield,
a traffic accident,
a natural disaster,
a household accident,
a riot,
a marine accident,
a casualty evacuation, a medical evacuation,
a casualty collection point (CCP), or
a firefighting accident.

11. The system of claim 1, wherein the system comprises:
one or more user sensors configured to detect a user parameter of the user conducting the treatment, the one or more user sensors corresponding to at least one of the following:
a pulse oximeter,
a capnography,
a glucose meter,
a pulse meter,
a heart rate variability sensor,
a breathing sensor,
a video-oculography, or
electrooculography sensor.

12. The system of claim 10, wherein the acoustic and physical stimulus to the user conducting the treatment is generated by one or more environment actuators placed in the virtual environment, and controlled by the simulation system, and
wherein the one or more environment actuators corresponds to at least one of the following:
a motor,
a speaker,
a water sprinkler,
a fan,
a pump,
a gas/liquid/solid exhaust, or
a flame and smoke generator.

13. The system of claim 1, wherein the embedded system is incorporated into at least one of the following:
a garment,
an item,
a device,
a wearable, or
a bag.

14. A method for simulating injury treatment on a living body, the method comprising:
simulating by an embedded system placed on a living body an injury of the living body in response to instructions received from a simulation system;
detecting by one or more sensors placed on a living body a parameter corresponding to a treatment of said injury, said one or more sensors being configured to transmit said detected parameter to said simulation system;
performing the following steps by said simulation system connected to said one or more sensors:
transmitting the instructions to said embedded system to cause said embedded system to simulate an injury of the living body;
receiving sensor data representing said parameter detected by said one or more sensors and representing a treatment of said simulated injury;
executing a simulation scenario, which associates said detected parameter representing a treatment of said injury with a corresponding effect on said injury;
sending instructions to said embedded system, which cause said embedded system to simulate said injury such that the simulation reflects said treatment; and
transmitting by said simulation system instructions to an earphone configured to be placed in an ear of the living body to be treated.

15. A computer program product comprising computer program code, which, when being executed on a computer, causes said computer to perform the following:
transmitting from a simulation system to an embedded system instructions to cause said embedded system placed on a living body to simulate an injury of the living body;
detecting by one or more sensors placed on a living body a parameter corresponding to a treatment of said injury, said one or more sensors being configured to transmit said detected parameter to said simulation system;
performing the following steps by said simulation system connected to said one or more sensors:
transmitting the instructions to said embedded system to cause said embedded system to simulate an injury of the living body;
receiving sensor data representing said parameter detected by said one or more sensors and representing a treatment of said simulated injury;
executing a simulation scenario, which associates said detected parameter representing a treatment of said injury with a corresponding effect on said injury;
sending instructions to said embedded system, which cause said embedded system to simulate said injury such that the simulation reflects said treatment; and
transmitting by said simulation system instructions to an earphone configured to be placed in an ear of the living body to be treated.

* * * * *